(12) United States Patent
Jang et al.

(10) Patent No.: US 11,338,689 B2
(45) Date of Patent: May 24, 2022

(54) SYSTEM AND METHOD FOR CONTROLLING VEHICLE INCLUDING SOLAR CELL

(71) Applicants: HYUNDAI MOTOR COMPANY, Seoul (KR); KIA MOTORS CORPORATION, Seoul (KR)

(72) Inventors: Young Jin Jang, Seoul (KR); Jun Yeon Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 336 days.

(21) Appl. No.: 16/658,659

(22) Filed: Oct. 21, 2019

(65) Prior Publication Data
US 2020/0338990 A1 Oct. 29, 2020

(30) Foreign Application Priority Data
Apr. 23, 2019 (KR) .......................... 10-2019-0047388

(51) Int. Cl.
*B60L 53/22* (2019.01)
*B60L 8/00* (2006.01)
(Continued)

(52) U.S. Cl.
CPC ............... *B60L 53/22* (2019.02); *B60L 8/003* (2013.01); *B60L 15/38* (2013.01); *B60L 50/60* (2019.02);
(Continued)

(58) Field of Classification Search
CPC ....................................................... B60L 53/22
(Continued)

(56) References Cited

U.S. PATENT DOCUMENTS

| 2009/0001926 | A1* | 1/2009 | Sato | ........................ | B60L 3/003 |
| | | | | | 320/102 |
| 2010/0116565 | A1* | 5/2010 | Jang | ........................ | H02S 40/38 |
| | | | | | 180/2.2 |

(Continued)

FOREIGN PATENT DOCUMENTS

| JP | 2013-74733 A | 4/2013 |
| JP | 2015-82866 A | 4/2015 |

(Continued)

*Primary Examiner* — Jerry D Robbins
(74) *Attorney, Agent, or Firm* — Morgan, Lewis & Bockius LLP

(57) ABSTRACT

A system for controlling a vehicle including a solar cell includes: a high-voltage battery; a low voltage DC-DC converter (LDC) down-converting a voltage of the high-voltage battery; an auxiliary battery and an electrical load receiving the down-converted voltage from the LDC; a solar cell; a first solar cell converter converting output power of the solar cell into a voltage corresponding to a voltage of the auxiliary battery; a second solar cell converter converting the output power of the solar cell into a voltage corresponding to a voltage of the high-voltage battery; and a controller controlling operations of the LDC, the first solar cell converter, and the second solar cell converter based on a result of comparison between the output power of the solar cell and power consumption of the electrical load and based on a state of charge (SOC) of the auxiliary battery.

19 Claims, 4 Drawing Sheets

(51) Int. Cl.
 B60L 50/60 (2019.01)
 B60L 15/38 (2006.01)
 B60K 16/00 (2020.01)
(52) U.S. Cl.
 CPC ..... *B60K 2016/003* (2013.01); *B60L 2210/12* (2013.01)
(58) Field of Classification Search
 USPC .......................................................... 320/101
 See application file for complete search history.

(56) References Cited

U.S. PATENT DOCUMENTS

| | | | | |
|---|---|---|---|---|
| 2012/0136534 | A1* | 5/2012 | Walsh | B60K 16/00 701/36 |
| 2013/0320911 | A1* | 12/2013 | Kamiya | B60L 53/22 320/101 |
| 2014/0095018 | A1* | 4/2014 | Atluri | B60L 58/13 701/36 |
| 2015/0291052 | A1* | 10/2015 | Nakazawa | B60R 16/03 320/101 |
| 2015/0349582 | A1* | 12/2015 | Maeno | B60L 3/0046 320/101 |
| 2016/0075243 | A1* | 3/2016 | Okumura | H02J 7/16 318/139 |
| 2016/0089986 | A1* | 3/2016 | Maeno | B60L 50/40 320/101 |
| 2016/0380473 | A1* | 12/2016 | Henningson | B60L 53/665 320/101 |
| 2017/0267113 | A1* | 9/2017 | Harada | B60L 3/0084 |
| 2018/0043788 | A1* | 2/2018 | Kuribara | B60L 8/003 |
| 2018/0105042 | A1* | 4/2018 | Kuribara | B60L 53/51 |
| 2018/0154778 | A1* | 6/2018 | Ota | H02J 7/0068 |
| 2019/0074711 | A1* | 3/2019 | Go | H02J 7/0048 |
| 2019/0296575 | A1* | 9/2019 | Yang | H02J 7/35 |

FOREIGN PATENT DOCUMENTS

| | | |
|---|---|---|
| JP | 6380435 B2 | 8/2018 |
| KR | 10-2016-0071668 A | 6/2016 |
| KR | 10-1786370 A | 10/2017 |

* cited by examiner

SYSTEM AND METHOD FOR CONTROLLING VEHICLE INCLUDING SOLAR CELL

CROSS REFERENCE TO RELATED APPLICATION

The present application claims the benefit of priority to Korean Patent Application No. 10-2019-0047388, filed on Apr. 23, 2019 in the Korean Intellectual Property Office, the entire contents of which is incorporated herein by reference.

TECHNICAL FIELD

The present disclosure relates generally to a system and method for controlling vehicle including a solar cell. More particularly, the present disclosure relates to a system and method for controlling a vehicle including a solar cell, the system and the method being capable of charging an auxiliary battery with optimum efficiency based on output power of the solar cell and power consumption of a vehicle electrical load in consideration of efficiency of various power conversion circuits provided in the vehicle.

BACKGROUND

Recently, in addition to an environmentally friendly vehicle that is powered by a motor using electric energy, research on a vehicle provided with a solar cell that generates electric power by converting solar energy into electric energy has been actively conducted.

A typical environmentally friendly vehicle may include a high-voltage battery for storing electric energy for driving a motor, an auxiliary battery for supplying electric power of a power source to a vehicle electrical load, and a low voltage DC-DC converter (LDC) that down-converts the voltage of the high-voltage battery to supply charging power to the auxiliary battery or to supply electric power of a power source to the vehicle electrical load. Furthermore, a solar cell system provided in an environmentally friendly vehicle supplies electric power generated by a solar cell to an auxiliary battery or a high-voltage battery to be charged.

In an environmentally friendly vehicle having such a solar cell system as described above, the high-voltage battery or the auxiliary battery may be charged through various charging paths, where various power converters for converting charging power to an appropriate level are needed.

A power converter may be problematic in that loss of power may inevitably occur due to the characteristics of switches or elements used therein, leading to reduction of a charging efficiency.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a system and a method for controlling a vehicle including a solar cell, the system and the method being capable of minimizing loss due to power conversion, thus improving charging efficiency.

In order to achieve the above objective, according to one aspect of the present disclosure, a system for controlling a vehicle including a solar cell may include: a high-voltage battery; a low voltage DC-DC converter (LDC) down-converting a voltage of the high-voltage battery and outputting the down-converted voltage; an auxiliary battery and an electrical load each receiving the down-converted voltage from the LDC; a solar cell converting solar energy into electric energy; a first solar cell converter converting output power of the solar cell into a voltage corresponding to a voltage of the auxiliary battery and outputting the converted voltage to the auxiliary battery and the electrical load; a second solar cell converter converting the output power of the solar cell into a voltage corresponding to a voltage of the high-voltage battery and outputting the converted voltage to the high-voltage battery; and a controller configured to control operations of the LDC, the first solar cell converter, and the second solar cell converter based on a result of comparison between the output power of the solar cell and power consumption of the electrical load and based on a state of charge (SOC) of the auxiliary battery.

In an exemplary embodiment of the present disclosure, when the output power of the solar cell is equal to or greater than the power consumption of the electrical load, the controller may selectively operate one of the first and second solar cell converters based on the SOC of the auxiliary battery and control the LDC to stop outputting power.

In an exemplary embodiment of the present disclosure, when the output power of the solar cell is equal to or greater than the power consumption of the electrical load and the SOC of the auxiliary battery reaches a predetermined value that indicates a fully-charged state, the controller may turn off the first solar cell converter and turn on the second solar cell converter, and the controller may turn off the LDC or control the LDC such that an output current of the LDC is zero.

In an exemplary embodiment of the present disclosure, when the output power of the solar cell is equal to or greater than the power consumption of the electrical load and the SOC of the auxiliary battery does not reach a predetermined value that indicates a fully-charged state, the controller may turn on the first solar cell converter and turn off the second solar cell converter, and the controller may turn off the LDC or control the LDC such that an output current of the LDC is zero.

In an exemplary embodiment of the present disclosure, when the output power of the solar cell is less than the power consumption of the electrical load, the controller may turn on the first solar cell converter and turn off the second solar cell converter, and the controller may control the operation of the LDC based on the SOC of the auxiliary battery.

In an exemplary embodiment of the present disclosure, when the output power of the solar cell is less than the power consumption of the electrical load, the controller may turn on the first solar cell converter and turn off the second solar cell converter, and when the SOC of the auxiliary battery is greater than a predetermined reference value, the controller may turn off the LDC or control the LDC such that an output current of the LDC is zero.

In an exemplary embodiment of the present disclosure, when the output power of the solar cell is less than the power consumption of the electrical load, the controller may turn on the first solar cell converter and turn off the second solar cell converter, and when the SOC of the auxiliary battery is equal to or less than a predetermined reference value, the controller may turn on the LDC.

In an exemplary embodiment of the present disclosure, the controller may control the LDC to output a current at which power conversion efficiency of the LDC is maximized.

According to another aspect of the present disclosure, a method for controlling a system of a vehicle including a solar cell, the system including a high-voltage battery, a low voltage DC-DC converter (LDC) down-converting a voltage of the high-voltage battery and outputting the down-converted voltage, an auxiliary battery and an electrical load each receiving the down-converted voltage from the LDC, a solar cell converting solar energy into electric energy, a first solar cell converter converting output power of the solar cell into a voltage corresponding to a voltage of the auxiliary battery and outputting the converted voltage to the auxiliary battery and the electrical load, and a second solar cell converter converting the output power of the solar cell into a voltage corresponding to a voltage of the high-voltage battery and outputting the converted voltage to the high-voltage battery. The method may include steps of: comparing output power of the solar cell with power consumption of the electrical load; checking a state of charge (SOC) of the auxiliary battery; and controlling operations of the LDC, the first solar cell converter, and the second solar cell converter based on a result of comparison between the output power of the solar cell and the power consumption of the electrical load and based on the SOC of the auxiliary battery.

In an exemplary embodiment of the present disclosure, the step of controlling may include, when the output power of the solar cell is equal to or greater than the power consumption of the electrical load and the SOC of the auxiliary battery reaches a predetermined value that indicates a fully-charged state, turning off the first solar cell converter and turning on the second solar cell converter, and turning off the LDC or controlling the LDC such that an output current of the LDC is zero.

In an exemplary embodiment of the present disclosure, the step of controlling may include, when the output power of the solar cell is equal to or greater than the power consumption of the electrical load and the SOC of the auxiliary battery does not reach a predetermined value that indicates a fully-charged state, turning on the first solar cell converter and turning off the second solar cell converter, and turning off the LDC or controlling the LDC such that an output current of the LDC is zero.

In an exemplary embodiment of the present disclosure, the step of controlling may include, when the output power of the solar cell is less than the power consumption of the electrical load, turning on the first solar cell converter and turning off the second solar cell converter, and when the SOC of the auxiliary battery is greater than a predetermined reference value, turning off the LDC or controlling the LDC such that an output current of the LDC is zero.

In an exemplary embodiment of the present disclosure, the step of controlling may include, when the output power of the solar cell is less than the power consumption of the electrical load, turning on the first solar cell converter and turning off the second solar cell converter, and when the SOC of the auxiliary battery is equal to or less than a predetermined reference value, turning on the LDC.

In an exemplary embodiment of the present disclosure, the step of controlling may include controlling the LDC to output a current at which power conversion efficiency of the LDC is maximized.

According to various aspects of the present disclosure, a system for controlling a vehicle including the solar cell and a method for controlling such a system, by considering an efficiency of various power conversion circuits included in the system, can make it possible to control turning on/off and operation modes of various converters such that optimal efficiency of the entire system is achieved. This can also make it possible to minimize loss of power due to unnecessary power conversion which is not used in an actual vehicle operation, thus improving fuel mileage of the vehicle and reducing aging and deterioration of the power conversion circuits.

The effects obtained by the present disclosure are not limited to the above-mentioned effects, and other effects not mentioned can be clearly understood by those skilled in the art from the following description.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereinbelow, exemplary embodiments of a system and method for a vehicle including a solar cell will be described in detail with reference to the accompanying drawings.

Figure 1:
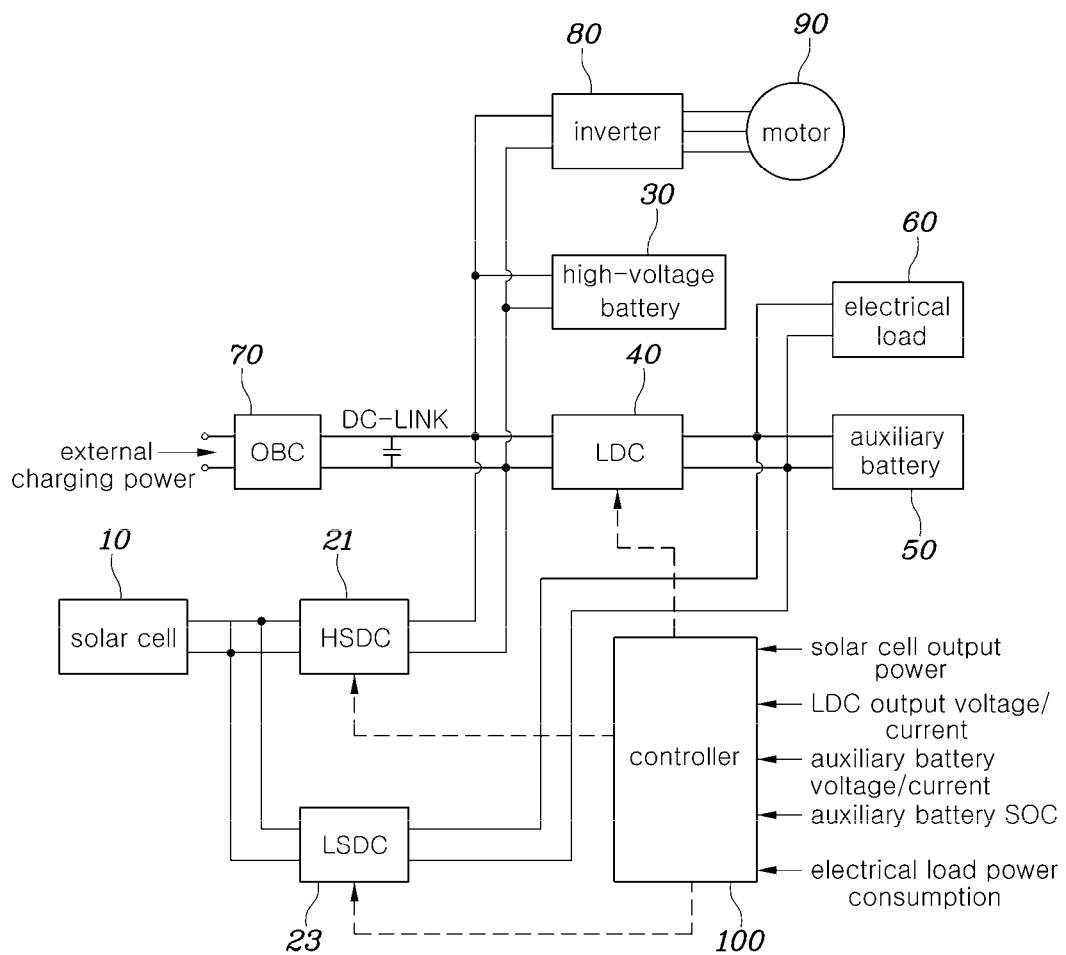
FIG. 1 is a block diagram showing a system of controlling a vehicle including a solar cell according to an exemplary embodiment of the present disclosure.

FIG. 1 is a block diagram showing a system of controlling a vehicle including a solar cell according to an exemplary embodiment of the present disclosure.

Referring to FIG. 1, the system of controlling the vehicle including the solar cell according to an exemplary embodiment of the present disclosure includes a high-voltage battery 30, a low voltage DC-DC converter (LDC) 40 down-converting a voltage of the high-voltage battery and outputting the down-converted voltage, an auxiliary battery 50 and an electrical load 60 receiving the down-converted voltage from the LDC 40, a solar cell 10 converting solar energy into electric energy, a first solar cell converter (LSDC) 23 converting output power of the solar cell 10 into a voltage corresponding to the voltage of the auxiliary battery 50 and outputting the converted voltage to the auxiliary battery 50 and the electrical load 60, a second solar cell converter (HSDC) 21 converting the output power of the solar cell 10 into a voltage corresponding to the voltage of the high-voltage battery 30 and outputting the converted voltage to the high-voltage battery 30, and a controller 100 controlling operations of the LDC 40, the LSDC 23, and the HSDC 21 based on a result of comparison between the output power of the solar cell 10 and power consumption of the electrical load 60 and based on a state of charge (SOC) of the auxiliary battery 50.

The controller 100 of the apparatus according to an exemplary embodiment of the present disclosure may be a processor (e.g., computer, microprocessor, CPU, ASIC, circuitry, logic circuits etc.). The controller 100 may be implemented by a non-transitory memory storing, e.g., a program (s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The high-voltage battery 30 is a device that stores high-voltage electric energy provided to a motor 90 that generates power for an environmentally friendly vehicle. At the output terminal of the high-voltage battery 30, a high-voltage direct current-link (DC-link) is formed by a capacitor. Various components for receiving high-voltage power or supplying the high-voltage power to a battery may be connected to the DC-link. Example of such components connected to the DC-link may include an inverter 80 for converting DC power input from the DC-link into three-phase AC power and providing the three-phase AC power to the motor 90, and an on-board charger (OBC) 70 for converting AC power supplied from an external charging facility to supply charging power to the high-voltage battery 30. In addition, an output terminal of the HSDC 21 that will be described later, which outputs a high voltage, may be connected to the DC-link.

The LDC 40 is connected to a DC-link terminal and functions to convert high-voltage DC power of the high-voltage battery 30 into a low voltage and output the low voltage. The LDC 40 may be implemented using a topology of several DC-DC converters known in the art.

The auxiliary battery 50 has a relatively low voltage as compared with the high-voltage battery 30 and may be connected to an output terminal of the LDC 40. The auxiliary battery 50 may supply power to the electrical load 60.

The electrical load 60 collectively refers to various loads of the vehicle that consumes electric energy and may be connected to an output terminal of the LDC 40 together with the auxiliary battery 50.

In a state where the start of the vehicle is turned off or the LDC 40 is turned off, the electrical load 60 may be operated by receiving the entire power from the auxiliary battery 50. When the LDC 40 outputs sufficient voltage and current in an on state, the electrical load 60 may be operated by receiving DC power that is converted and output by the LDC 40. When the DC power converted and output by the LDC 40 is insufficient, the electrical load 60 may be operated by receiving a shortage from the auxiliary battery 50. Furthermore, when the DC power converted and output by the LDC 40 is sufficient, remaining output power of the LDC 40 that remains after being supplied to the electrical load 60 may be supplied to the auxiliary battery 50 to charge the auxiliary battery 50.

The solar cell 10 is an element for converting solar energy such as sunlight into electric energy. The solar cell 10 may be provided at a position appropriate for receiving light such as a roof of the vehicle. The solar cell 10 may have output power that varies depending on the amount of light received. Due to this, the output power of the solar cell 10 may be monitored by the controller 100. Although not shown in the drawings, the solar cell 10 may have a voltage sensor and a current sensor that are provided at an output terminal thereof. The controller 100 monitors the output power of the solar cell 10 by calculating the output power of the solar cell 10 based on detection values of the voltage sensor and the current sensor.

To convert power output from the solar cell 10 into a voltage of an appropriate level that can be applied to the system, to the LSDC 23 and the HSDC 21 may be connected to the output terminal of the solar cell 10.

The LSDC 23 is a converter for converting an output voltage of the solar cell 10 into a voltage corresponding to the voltage of the auxiliary battery 50. The HSDC 21 is a converter for converting the output voltage of the solar cell 10 into a voltage corresponding to the voltage of the high-voltage battery 30. Therefore, an input terminal of the first solar cell converter 23 may be connected to the output terminal of the solar cell 10, and an output terminal of the first solar cell converter 23 may be connected to the auxiliary battery 50. Due to the fact that the auxiliary battery 50 is connected to the LDC 40 and the electrical load 60, the output terminal of the first solar cell converter 23 may be connected to a node at which the LDC 40, the electrical load 60, and the auxiliary battery 50 are connected in common. Furthermore, an input terminal of the HSDC 21 may be connected to the output terminal of the solar cell 10 while the output terminal of the HSDC 21 may be connected to the high-voltage battery 30.

The controller 100 controls operations of the LSDC 23, the second solar cell 23, and the LDC 40 based on the result of comparison between the output power of the solar cell 10 and the power consumption of the electrical load 60 and based on the SOC of the auxiliary battery 50, such that power conversion can be performed with optimal efficiency.

In one exemplary embodiment of the present disclosure, the controller 100 preferentially considers conditions under which the auxiliary battery 50 can stably operate based on the SOC of the auxiliary battery 50, such that efficient power conversion can be performed.

Figure 2:
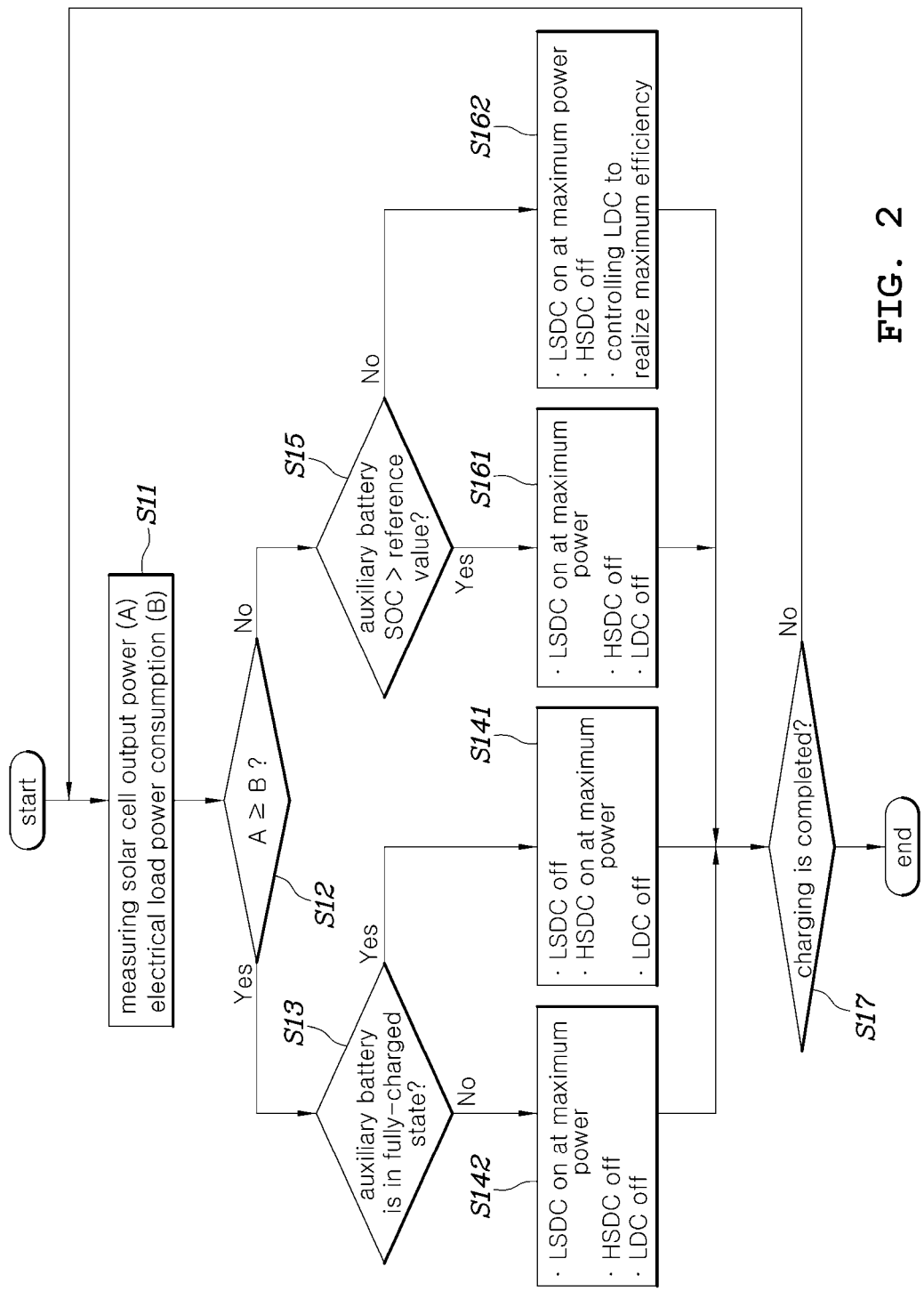
FIG. 2 is a flowchart showing a method for controlling a vehicle including a solar cell according to an exemplary embodiment of the present disclosure.

FIG. 2 is a flowchart showing a method for controlling a vehicle including a solar cell according to an exemplary embodiment of the present disclosure. The method for controlling the vehicle including the solar cell according to an exemplary embodiment of the present disclosure will be described with reference to FIG. 2. Therefore, the operation and effects of the system according to the above-described embodiment of the present disclosure will be more clearly understood.

Referring to FIG. 2, the method for controlling the vehicle including the solar cell according to an exemplary embodiment of the present disclosure starts by measuring output power A of a solar cell 10 and power consumption B of an electrical load 60 (S11). As described above, the output power of the solar cell 10 is calculated by a controller 100 through a voltage sensor and a current sensor provided at an output terminal of the solar cell 10. Furthermore, the power consumption of the electrical load 60 may be calculated by a separate individual controller for controlling the electrical load 60. The power consumption of the electrical load 60 calculated by the individual controller may be directly supplied to the controller 100. Alternatively, a total power consumption of the electrical load 60 in operation may be calculated by a host controller and be supplied to the controller 100.

Next, the controller 100 compares the output power A of the solar cell 10 with the power consumption B of the electrical load 60 (S12).

Then, when the output power of the solar cell 10 is equal to or greater than the power consumption of the electrical load 60, the controller 100 checks an SOC of an auxiliary battery 50 (S13). Furthermore, when the output power of the solar cell 10 is less than the power consumption of the electrical load 60, the controller 100 checks the SOC of the auxiliary battery 50.

As described above, the controller 100 compares the output power of the solar cell 10 with the power consumption of the electrical load 60 and checks the SOC of the auxiliary battery 50. This is to achieve efficient power conversion with the lowest loss in consideration of loss of each of the converters 40, 21, and 23 used for power conversion.

Figure 3:
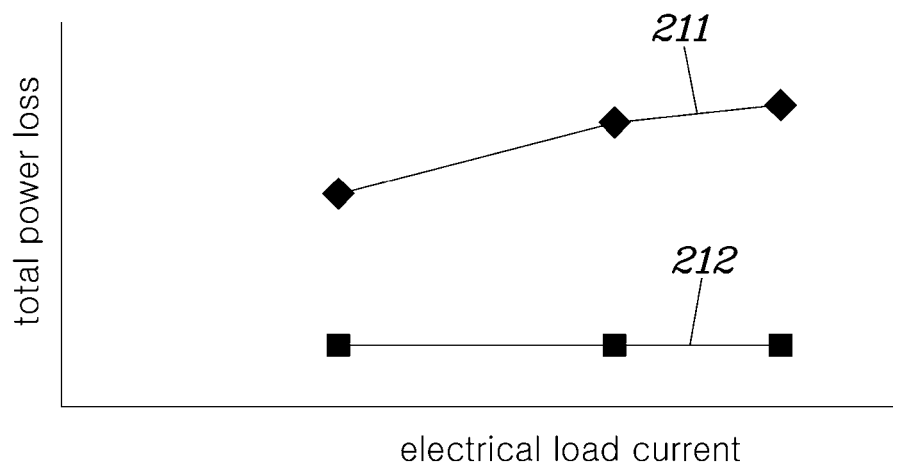
FIGS. 3 and 4 are graphs showing power consumption (current) of an electrical load and loss due to operation of each converter in the system of controlling the vehicle including the solar cell according to exemplary embodiments of the present disclosure.
Figure 4:
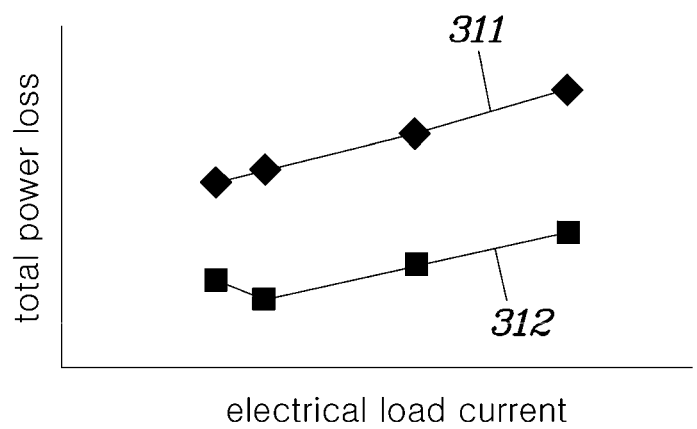

FIGS. 3 and 4 are graphs showing power consumption (current) of an electrical load and loss of power due to operation of each converter in the system of controlling the vehicle including the solar cell according to exemplary embodiments of the present disclosure.

FIG. 3 is a graph showing power consumed in charging the auxiliary battery 50 when the output power of the solar cell 10 is greater than the power consumption of the electrical load 60. In FIG. 3, reference numeral "211" denotes a total loss that occurs when an LSDC 23 is turned off and an HSDC 21 is operated to supply the output power of the solar cell 10 through the high-voltage DC-link and then the LDC 40 is operated to supply charging power to the auxiliary battery 50. Furthermore, reference numeral "212" denotes a total loss that occurs when the HSDC 21 is turned off and only the LSDC 23 is operated to supply charging power to the auxiliary battery 50. When the output power of the solar cell 10 is greater than the power consumption of the electrical load 60, even when only the LSDC 23 is operated, remaining output power that remains after being supplied to the electrical load 60 can be used for charging the auxiliary battery 50. Therefore, in this case, only the LSDC 23 is operated.

As shown in FIG. 3, operating only the first solar cell converter 23 exhibits a relatively low loss.

FIG. 4 is a graph showing power consumed in charging the auxiliary battery 50 when the output of the solar cell 10 is less than the power consumption of the electrical load 60. In FIG. 4, reference numeral "311" denotes a total loss that occurs when the LSDC 23 is turned off and the HSDC 21 is operated to supply the output power of the solar cell 10 through the high-voltage DC-link and then the LDC 40 is operated to supply charging power to the auxiliary battery 50. Furthermore, reference numeral "312" denotes a total loss that occurs when the HSDC 21 is turned off and the LSDC 23 and the LDC 40 are operated to supply charging power to the auxiliary battery 50. When the output power of the solar cell 10 is less than the power consumption of the electrical load 60, power provided by the LSDC 23 is insufficient for supplying the power consumption of the electrical load 60. Therefore, in this case, the LDC 40 is required to be operated.

As shown in FIG. 4, operating only the first solar cell converter 23 and the LDC 40 exhibits a relatively low loss.

As can be seen from the results shown in FIGS. 3 and 4, the HSDC 21, which converts the output power of the solar cell 10 into a high voltage, generates a relatively high loss. Therefore, as in the present disclosure, it is preferable that prior to performing charging of the high-voltage battery 30 which necessarily requires conversion of the output power of the solar cell 10 into a high voltage, charging of the auxiliary battery 50 is performed. This can be more advantageous in terms of efficiency. Furthermore, it is preferable that only the LSDC 23 is used when the auxiliary battery 50 is charged, or both the LSDC 23 and the LDC 40 are operated when the output power of the solar cell 10 is insufficient.

In consideration of such characteristics of loss, the controller 100 controls operations of the LSDC 23, the HSDC 21, and the LDC 40, thus enabling power conversion with optimal efficiency.

Referring to FIG. 2 again, when it is determined that the output power of the solar cell 10 is equal to or greater than the power consumption of the electrical load 60 (S12) and it is determined that the SOC of the auxiliary battery 50 reaches a predetermined value that indicates a fully-charged state (S13), charging of the auxiliary battery 50 is not necessary. Therefore, the controller 100 turns off the LSDC 23 and the LDC 40, which can provide charging power to the auxiliary battery 50, and operates the HSDC 21 to output maximum power, thus charging the high-voltage battery 30 (S141).

Then, when it is determined that the output power of the solar cell 10 is equal to or greater than the power consumption of the electrical load 60 (S12) and it is determined that the SOC of the auxiliary battery 50 does not reach the predetermined value that indicates the fully-charged state (S13), the controller 100 performs an operation for first charging the auxiliary battery 50 (S142). In S142, only the output power of the solar cell 10 can be used to supply the power consumption of the electrical load 60 and supply remaining charging power. Therefore, the LDC 40 is turned off, and only the LSDC 23 is operated to output maximum power, such that the auxiliary battery 50 can be charged while preventing loss that occurs due to power conversion of the LDC 40. In S142, due to the fact that the controller 100 prioritizes charging of the auxiliary battery 50 over the high-voltage battery 30, the controller 100 turns off the HSDC 21.

Then, when it is determined that the output power of the solar cell 10 is less than the power consumption of the electrical load 60 (S12) and it is determined that the SOC of the auxiliary battery 50 is greater than a predetermined reference value (S15), the controller 100 operates the LSDC 23 to output maximum power and turns off the HSDC 21 and the LDC 40 (S161). Herein, the predetermined reference value is a reference value for determining whether charging of the auxiliary battery 50 is immediately needed. When the SOC of the auxiliary battery 50 is greater than the reference value, the controller 100 determines that charging of the auxiliary battery 50 is not immediately needed. When the SOC of the auxiliary battery 50 is less than the reference value, the controller 100 performs control to immediately charge the auxiliary battery 50.

In S161, the controller 100 operates the LSDC 23 to output maximum power and turns off the LDC 40 such that the power consumption of the electrical load 60 that can not be supplied by the output power of the solar cell 10 is supplemented by power stored in the auxiliary battery 50. In S161, when it is determined that the SOC of the auxiliary battery 50 is sufficiently high and charging is not immediately needed, the controller 100 turns off the LDC 40 such that loss is prevented from occurring due to the LDC 40.

Then, when it is determined that the output power of the solar cell 10 is less than the power consumption of the electrical load 60 (S12) and it is determined that the SOC of the auxiliary battery 50 is equal to or less than the predetermined reference value (S15), the controller 100 operates the LSDC 23 to output maximum power, turns off the HSDC 21, and controls the LDC 40 to operate at a maximum efficiency point M (S162).

In S162, due to the fact that the SOC of the auxiliary battery 50 indicates that charging is needed, the controller 100 allows a charging current to be supplied to the auxiliary battery 50. Furthermore, due to the fact that the output power of the solar cell 10 is insufficient for supplying the power consumption of the electrical load 60, the controller 100 operates the LDC 40 to supply a shortage amount of power to the electrical load 60, while providing the charging current to the auxiliary battery 50.

Figure 5:
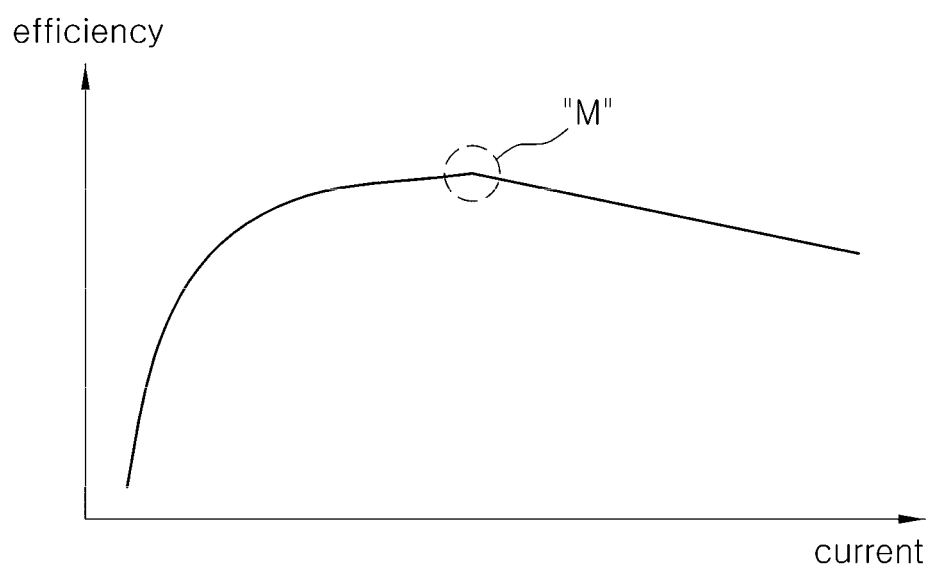
FIG. 5 is a graph showing power conversion efficiency characteristics of an LDC applied to the system of controlling the vehicle including the solar cell according to an exemplary embodiment of the present disclosure.

FIG. 5 is a graph showing power conversion efficiency characteristics of an LDC applied to the system of controlling the vehicle including the solar cell according to an exemplary embodiment of the present disclosure.

As shown in FIG. 5, in general, power conversion circuits such as LDCs and the like vary in power conversion efficiency depending on output current. That is, it is generally known that the efficiency of an LDC is maximized when a current of a specific level is output.

In S162, the controller 100 controls the LDC 40 to output a current at which the power conversion efficiency of the LDC 40 is maximized, thus maximizing the efficiency of the entire system. That is, in one exemplary embodiment of the present disclosure, the controller 100 operates the LDC 40 only when the LDC 40 is necessarily required to be operated to charge the auxiliary battery 50. In this case, as in S162, the controller 100 controls the LDC 40 to output a current at which the power conversion efficiency of the LDC 40 is maximized.

As described above, according to various exemplary embodiments of the present disclosure, turning on/off and operation modes of various converters can be controlled by considering an efficiency of various power conversion circuits included in a system for controlling a vehicle including a solar cell, such that optimal efficiency of the entire system is achieved. This makes it possible to minimize loss of power due to unnecessary power conversion which is not used in an actual vehicle operation, thus improving fuel mileage of the vehicle and reducing aging and deterioration of the power conversion circuits.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A system for controlling a vehicle including a solar cell, the system comprising:
   a high-voltage battery;
   a low voltage DC-DC converter (LDC) down-converting a voltage of the high-voltage battery and outputting the down-converted voltage;
   an auxiliary battery and an electrical load each receiving the down-converted voltage from the LDC;
   a solar cell converting solar energy into electric energy;
   a first solar cell converter converting output power of the solar cell into a voltage corresponding to a voltage of the auxiliary battery and outputting the converted voltage to the auxiliary battery and the electrical load;
   a second solar cell converter converting the output power of the solar cell into a voltage corresponding to a voltage of the high-voltage battery and outputting the converted voltage to the high-voltage battery; and
   a controller configured to control operations of the LDC, the first solar cell converter, and the second solar cell converter based on a result of comparison between the output power of the solar cell and power consumption of the electrical load, and based on a state of charge (SOC) of the auxiliary battery,
   wherein an output terminal of the first solar cell converter is connected to a node at which the LDC, the electrical load, and the auxiliary battery are connected in common, and
   wherein the output power of the solar cell is supplied to the LDC through the second solar cell converter.

2. The system of claim 1, wherein, when the output power of the solar cell is equal to or greater than the power consumption of the electrical load, the controller selectively operates one of the first and second solar cell converters based on the SOC of the auxiliary battery and controls the LDC to stop outputting power.

3. The system of claim 2, wherein, when the output power of the solar cell is equal to or greater than the power consumption of the electrical load and the SOC of the auxiliary battery reaches a predetermined value that indicates a fully-charged state, the controller turns off the first solar cell converter and turns on the second solar cell converter, and the controller turns off the LDC or controls the LDC such that an output current of the LDC is zero.

4. The system of claim 2, wherein, when the output power of the solar cell is equal to or greater than the power consumption of the electrical load and the SOC of the auxiliary battery does not reach a predetermined value that indicates a fully-charged state, the controller turns on the first solar cell converter and turns off the second solar cell converter, and the controller turns off the LDC or controls the LDC such that an output current of the LDC is zero.

5. The system of claim 1, wherein, when the output power of the solar cell is equal to or greater than the power consumption of the electrical load and the SOC of the auxiliary battery reaches a predetermined value that indicates a fully-charged state, the controller turns off the first solar cell converter and turns on the second solar cell converter, and the controller turns off the LDC or controls the LDC such that an output current of the LDC is zero.

6. The system of claim 1, wherein, when the output power of the solar cell is equal to or greater than the power consumption of the electrical load and the SOC of the auxiliary battery does not reach a predetermined value that indicates a fully-charged state, the controller turns on the first solar cell converter and turns off the second solar cell converter, and the controller turns off the LDC or controls the LDC such that an output current of the LDC is zero.

7. The system of claim 1, wherein, when the output power of the solar cell is less than the power consumption of the electrical load, the controller turns on the first solar cell converter and turns off the second solar cell converter, and the controller controls the operation of the LDC based on the SOC of the auxiliary battery.

8. The system of claim 7, wherein:
   when the output power of the solar cell is less than the power consumption of the electrical load, the controller turns on the first solar cell converter and turns off the second solar cell converter, and
   when the SOC of the auxiliary battery is greater than a predetermined reference value, the controller turns off the LDC or controls the LDC such that an output current of the LDC is zero.

9. The system of claim 7, wherein:
   when the output power of the solar cell is less than the power consumption of the electrical load, the controller turns on the first solar cell converter and turns off the second solar cell converter, and when the SOC of the auxiliary battery is equal to or less than a predetermined reference value, the controller turns on the LDC.

10. The system of claim 9, wherein the controller controls the LDC to output a current at which power conversion efficiency of the LDC is maximized.

11. The system of claim 1, wherein:
when the output power of the solar cell is less than the power consumption of the electrical load, the controller turns on the first solar cell converter and turns off the second solar cell converter, and
when the SOC of the auxiliary battery is greater than a predetermined reference value, the controller turns off the LDC or controls the LDC such that an output current of the LDC is zero.

12. The system of claim 1, wherein:
when the output power of the solar cell is less than the power consumption of the electrical load, the controller turns on the first solar cell converter and turns off the second solar cell converter, and
when the SOC of the auxiliary battery is equal to or less than a predetermined reference value, the controller turns on the LDC.

13. The system of claim 12, wherein the controller controls the LDC to output a current at which power conversion efficiency of the LDC is maximized.

14. A method for controlling a system of a vehicle including a solar cell, the system including a high-voltage battery, a low voltage DC-DC converter (LDC) down-converting a voltage of the high-voltage battery and outputting the down-converted voltage, an auxiliary battery and an electrical load each receiving the down-converted voltage from the LDC, a solar cell converting solar energy into electric energy, a first solar cell converter converting output power of the solar cell into a voltage corresponding to a voltage of the auxiliary battery and outputting the converted voltage to the auxiliary battery and the electrical load, and a second solar cell converter converting the output power of the solar cell into a voltage corresponding to a voltage of the high-voltage battery and outputting the converted voltage to the high-voltage battery, the method comprising steps of:
comparing output power of the solar cell with power consumption of the electrical load;
checking a state of charge (SOC) of the auxiliary battery; and
controlling operations of the LDC, the first solar cell converter, and the second solar cell converter based on a result of comparison between the output power of the solar cell and the power consumption of the electrical load and based on the SOC of the auxiliary battery, wherein an output terminal of the first solar cell converter is connected to a node at which the LDC, the electrical load, and the auxiliary battery are connected in common, and
wherein the output power of the solar cell is supplied to the LDC through the second solar cell converter.

15. The method of claim 14, wherein the step of controlling includes, when the output power of the solar cell is equal to or greater than the power consumption of the electrical load and the SOC of the auxiliary battery reaches a predetermined value that indicates a fully-charged state, turning off the first solar cell converter and turning on the second solar cell converter, and turning off the LDC or controlling the LDC such that an output current of the LDC is zero.

16. The method of claim 14, wherein the step of controlling includes, when the output power of the solar cell is equal to or greater than the power consumption of the electrical load and the SOC of the auxiliary battery does not reach a predetermined value that indicates a fully-charged state, turning on the first solar cell converter and turning off the second solar cell converter, and turning off the LDC or controlling the LDC such that an output current of the LDC is zero.

17. The method of claim 14, wherein the step of controlling includes:
when the output power of the solar cell is less than the power consumption of the electrical load, turning on the first solar cell converter and turning off the second solar cell converter; and
when the SOC of the auxiliary battery is greater than a predetermined reference value, turning off the LDC or controlling the LDC such that an output current of the LDC is zero.

18. The method of claim 14, wherein the step of controlling includes:
when the output power of the solar cell is less than the power consumption of the electrical load, turning on the first solar cell converter and turning off the second solar cell converter; and
when the SOC of the auxiliary battery is equal to or less than a predetermined reference value, turning on the LDC.

19. The method of claim 18, wherein the step of controlling includes controlling the LDC to output a current at which power conversion efficiency of the LDC is maximized.

* * * * *